May 26, 1931.  H. A. SHELDON  1,807,348
DEVICE FOR TRIMMING CORN
Filed April 3, 1929
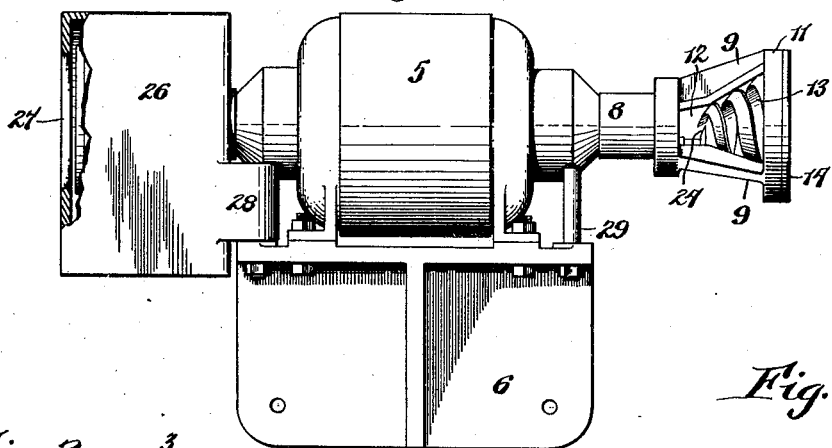
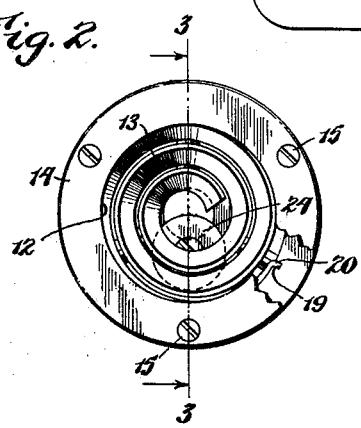
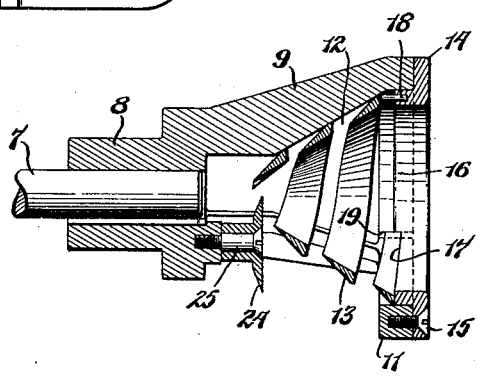
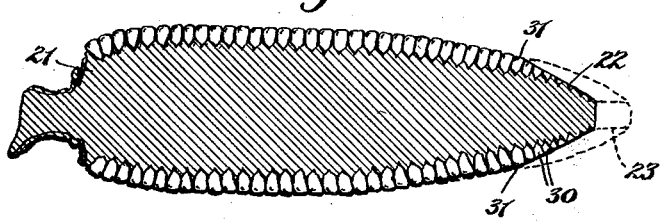
Inventor
Henry A. Sheldon
By Popp + Powers
Attorneys Patented May 26, 1931

1,807,348

UNITED STATES PATENT OFFICE

HENRY A. SHELDON, OF BUFFALO, NEW YORK, ASSIGNOR TO SPRAGUE-SELLS CORPORATION, OF HOOPESTON, ILLINOIS, A CORPORATION OF DELAWARE

DEVICE FOR TRIMMING CORN

Application filed April 3, 1929. Serial No. 352,288.

This invention relates to a method and device for trimming corn and more particularly to a device for trimming off the tips of such ears as have been attacked by the corn borer or in which the kernels at the tip of the ear have otherwise been rendered unfit for use, this device thereby enabling the bulk of the kernels on the ear to be used.

In canning corn commercially, ears of corn are frequently encountered which have been attacked by the corn borer. The corn borer enters the tip of the ear of corn and attacks the kernels and the core of the ear at the tip and renders the tip kernels wholly unfit for canning, the remainder of the kernels on the body of the ear being, however, wholly unattacked and entirely fit for canning. To save the useable kernels on the ear, it has been the practice to sever the tips of the ears which have been so attacked and run the bodies of such ears, along with the perfect ears through the green corn cutter in which the kernels are shaved off the cob.

As heretofore practiced this cutting of the injured tip of the ears attacked by the corn borer has been effected by a large hand knife, the tip having been cut off straight or diagonally. The latter method is preferable since the ear is fed tip first through the green corn cutter and is required to spread the scraping and cutting devices which cut off the kernels, but even with this latter method, the kernels at the slice or cut are left unsupported, and when the ear is passed through the green corn cutter, these kernels at the slice or cut are frequently knocked off as whole kernels instead of being cut into a number of slices as the rest of the kernels are. These whole kernels in the sliced corn are, of course, objectionable since the product is not uniform.

The present invention therefore proposes as its primary object a method and device for trimming the tips of ears of corn in such manner that the ear of corn will pass through the green corn cutting machine in the same manner as a normal ear of corn and spread the scraping and cutting devices to properly shave the kernels therefrom and in which the kernels at the tip are adequately supported so that there is no danger of whole kernels being knocked off and mixing with the mass of sliced kernels.

A further object is to provide such a rotary cutter for this purpose to which the husked ears are individually presented and in which the cutting edge of the same is so disposed that the ears are drawn into the knife, thereby avoiding the necessity of the operator having to force the ear into the knife with possible injury to himself.

A still further purpose is to provide such a device in which the waste is immediately thrown off and does not clog the knife and which can be quickly, easily and thoroughly cleaned and sterilized.

Another aim is to provide a device of this character which insures a smooth taper to the tip of the ear and in particular, prevents the formation of a small button on the tip of the tapered cob, which button would be likely to break off and mix with the sliced kernels during the green corn cutting operation.

Other objects are to provide a safe, simple and inexpensive device of this character which is easy to keep in good working condition and will not get out of order under severe conditions of use.

In the accompanying drawings:

Figure 1 is a side elevation of a motor driving two cutters embodying the present invention, the cutter at the left being enclosed by a housing or guard and the one at the right being exposed.

Figure 2 is an end view of the rotary cutter showing a part of the retaining collar broken away.

Figure 3 is a longitudinal section taken on line 3—3, Fig. 2.

Figure 4 is a longitudinal section through an ear of corn, the tip of which has been tapered in accordance with the present invention.

Similar reference numerals refer to similar parts in each of the several views.

In its general organization this invention comprises an electric motor on the opposite ends of the shaft of which revolving skeleton heads are mounted, each head having an opening in its outer end which is adapted to receive the end of the ear of corn, a spiral knife held in each of said heads under compression and the cutting edge of each knife being disposed so as to taper the end of the ear of corn inserted into each head, and the edge of said knife being so disposed as to tend to draw the ear inwardly, and a cutting disk arranged near the apex of the spiral knife and arranged to cut the tip of the tapered end of the ear of corn and prevent the formation of a button or stub at the end of the same which would be likely to be knocked off during the green corn cutting operation and be mixed with the sliced or cut kernels.

The motor 5 is suitably mounted on the bracket 6 and has a shaft 7 which projects outwardly from its bearings in the motor housing. On each end of the motor shaft 7 a hub 8 is suitably secured and formed integrally with this hub 8 are three outwardly projecting divergent arms 9, the outer ends of which are connected by an annular rim 11. It is therefore apparent that this head forms a pocket 12 which is adapted to receive the tip of the ear presented through the outer open end of the head.

Within this pocket is arranged a spiral knife 13, the several convolutions of which are arranged in different planes and are progressively smaller. As best shown in Fig. 3 each of these convolutions of the spiral knife 13 is wedge-shaped in cross section and the edge toward the shaft 7 is sharpened. This spiral knife 13 is held under compression against the arms 9 by a collar 14 which is secured to the rim 10 of the head by screws 15 or in any other suitable manner. The collar 14 has an inwardly projecting neck 16, which engages the outer end of the spiral knife 13. As best shown in Fig. 3 the inner end of the neck 16 is recessed on one side as indicated at 17 to support the end of the outermost convolution of the spiral knife for a substantial part of its length and one or more pins 18 can also be provided to support the outermost convolution of the spiral knife 13 at further points along this convolution. By the provision of the recess 17 and the pins 18 the end convolution of the spiral spring is supported at a number of points and hence when the collar 14 is screwed down the spiral spring is pressed inwardly on all sides and caused to be moved into firm engagement with the arms 9 of the head.

In order to prevent the spiral knife 13 from turning when an ear of corn is presented, the rim 10 is provided on its inner side with a longitudinal groove 19 and the end of the innermost convolution of the spiral knife 13 is bent outwardly as indicated at 20 and is received in this groove 19. It is therefore apparent that by this means the spiral knife is firmly held within the head and by the arrangement of its cutting edges it is also apparent that when the tip of the ear of corn 21 is inserted into the head the spiral knife will taper the tip as indicated at 22.

In using the knife as above described it was found that a button or stub was left in the tip of the taper, such a stub or button being indicated by the dotted lines 23 in Fig. 4. In subsequently running the ear through the green corn cutting machine this button or stub was frequently knocked off and mixed with the sliced kernels. To prevent this a small cutting disk or wheel 24 is secured to the hub 8 by means of a screw 26, this disk 24 being rotatably mounted on the screw 25 and being arranged tranverse to the axis of the shaft 7 and having its cutting edge arranged substantially at the axis of rotation of the head. By this means as the ear of corn is tapered and is drawn inwardly by the spiral tapering knife the button 23 formed by the tapering knife is cut off by the freely revolving disk cutter 24 and hence such button is prevented from forming.

To protect the operator, a housing 26 is provided for each cutter, this housing comprising a cast metal enclosure having an opening 27 at its outer end to permit the tip of the ear to be inserted into the revolving cutting head, an opening in its bottom to permit the shavings or chips to fall from the device and ears 28 which fit over supports 29 on the bracket. The hub 8 of the revolving head is preferably disposed in a slot in the housing 26 so that the housing can be lifted from the bracket to expose the cutting head and permit of its cleaning.

It is apparent that by tapering the end of the ear of corn in the manner described the tapered kernels 30 support one another and also support the outermost group of whole kernels 31. By this means when the ear of corn is passed through the green corn cutting machine there is no tendency for the end whole kernels 31 to be knocked off and form an undesirable addition to the sliced kernels since these kernels 31 are supported by the tapered kernels 30.

This invention therefore provides a method of trimming the tips of corn attacked by the corn borer in such manner that a shape closely approximating the original shape of the ear is maintained, and thereby insures the normal passage of the ear through the cutter and its normal operating of the cutting and scraping devices. The tapering of the ear also insures the adequate support of the whole kernels at the tip of the ear and avoids the danger of such whole kernels or bits of the core from being knocked off into the sliced product of the green corn cutter. The device for accomplishing this is also simple, reliable and effectively and quickly tapers the tip. It can also be easily kept in good working condition and free from dirt and pieces of husk and other material and will not get out of order under severe and constant use.

I claim as my invention:

1. A device for tapering the ends of ears of corn, comprising a rotary head, means for rotating said head, and knife means carried by said head, the edge of said knife means projecting toward the axis of said head and being arranged to taper and to cut a transverse substantially flat portion at the end of the ear inserted in said head.

2. A device for tapering the ends of ears of corn, comprising a rotary skeleton head, means for rotating said head, a knife carried by said head, the edge of said knife projecting toward the axis of said head and being arranged to taper the end of an ear inserted coaxially into said head, the shavings from said knife passing through openings provided in the sides of said head, and a housing for said head, said housing having an opening coaxial with said head for the insertion of the end of the ear, and having a discharge opening in its under side for the discharge of the shavings from said knife.

3. A device for tapering the ends of ears of corn, comprising a rotary head, means for rotating said head, and a knife carried by said head, the edge of said knife projecting toward the axis of said head and being arranged to taper the end of the ear inserted in said head, and said knife being arranged to draw said ear into said head as it is being tapered.

4. A device for tapering the ends of ears of corn, comprising a rotary head having an opening in its outer end, means for rotating said head, a knife arranged in said head and having its edge projecting toward the axis of said head and arranged to taper the end of an ear inserted through said opening, and a collar fitted in said opening and holding said knife in position.

5. A device for tapering the ends of ears of corn, comprising a rotary head having an opening in its outer end, means for rotating said head, said head being provided with a longitudinal slot on its inner side, a knife arranged in said slot and having its edge projecting toward the axis of said head and arranged to taper the end of an ear of corn inserted through said opening, and an annular collar fitted in said opening and holding said knife in said slot.

6. A device for tapering the ends of ears of corn, comprising a rotary head, means for rotating said head, a knife carried by said head, the edge of said knife projecting toward the axis of said head and being arranged to taper the end of the ear inserted in said head, and a second knife mounted in the inner end of said head and having its edge arranged transversely to the ear of corn, said second knife being arranged to cut the tip off the ear of corn.

7. A device for tapering the ends of ears of corn, comprising a rotary head, means for rotating said head, a knife carried by said head, the edge of said knife projecting toward the axis of said head and being arranged to taper the end of the ear inserted in said head, and a disk knife mounted in the inner end of said head and having its edge arranged transversely to the ear of corn and adjacent the axis thereof, said disk knife being freely rotatable and adapted to cut the tip off the ear of corn.

8. A device for tapering the ends of ears of corn, comprising a spiral knife and means for rotating said spiral knife concentric with its axis, said spiral knife being adapted to receive the ear of corn at its larger end and having its cutting edge arranged to taper the end of the ear.

9. A device for tapering the ends of ears of corn, comprising a spiral knife, the convolutions of which are arranged in different planes, and means for rotating said knife concentric with its axis, said spiral knife being adapted to receive the ear of corn at its larger end and the edge of said knife toward the small end of the spiral being sharpened whereby the knife tends to draw the ear of corn into the knife.

10. A device for tapering the ends of ears of corn, comprising a spiral knife, the convolutions of which are arranged in different planes, and means for rotating said knife concentric with its axis, said spiral knife being adapted to receive the ear of corn at its larger end, each convolution of said knife being wedge-shaped in cross section and the tapered edge toward the small end of the spiral being tapered and sharpened whereby the knife tends to draw the ear of corn into the knife.

11. A device for tapering the ends of ears of corn, comprising a skeleton head, means for rotating said head and a spiral knife arranged in said head concentric with the axis of said head, the several convolutions of said spiral knife being supported by said head, said spiral knife being adapted to receive the ear of corn at its larger end and having its cutting edge arranged to taper the end of the ear.

12. A device for tapering the ends of ears of corn, comprising a head, means for rotating said head, said head being formed to provide a conical pocket at its outer end concentric with the axis of rotation, a spiral knife arranged in said pocket, said spiral knife having its cutting edge arranged to taper the end of the ear inserted into said pocket, and an annular retaining collar fitted into the mouth of said pocket and holding the spiral knife under compression therein.

13. A device for tapering the ends of ears of corn, comprising a shaft, means for rotating said shaft, a hub fixed to said shaft, a plurality of divergent arms projecting outwardly from said hub, an annular rim connecting the ends of said arms, a spiral knife fitted in the pocket formed by said arms and supported thereby, said knife having its cutting edge arranged to taper the end of the ear inserted through said rim and a collar fitted to said rim and holding said knife in said pocket.

14. A device for tapering the ends of ears of corn, comprising a shaft, means for rotating said shaft, a hub fixed to said shaft, a plurality of divergent arms projecting radially outward from said hub, an annular rim connecting the ends of said arms, said rim being provided with a slot on its inner side parallel with the axis of said shaft, a spiral knife fitted in the pocket formed by said arms and supported thereby, said knife having its cutting edge arranged to taper the end of the ear inserted through said rim and having one end laterally bent and fitted into said slot, and a collar fitted to said rim and holding the end of said knife in said slot, said rim being formed to bear at different points on the outermost convolution of said spiral knife and hold said knife under compression in said pocket.

15. A device for tapering the ends of ears of corn, comprising a shaft, means for rotating said shaft, a hub fixed to said shaft, a plurality of divergent arms projecting outwardly from said hub, an annular rim connecting the ends of said arms, a spiral knife fitted in the pocket formed by said arms and supported thereby, said knife having its cutting edge arranged to taper the end of the ear inserted through said rim, means for retaining said knife in said pocket, and a freely rotatable cutting disk mounted on said hub and having its axis of rotation to one side of and parallel with the axis of said shaft, the outer cutting edge of said disk being arranged adjacent the axis of said spiral knife and adjacent the smallest convolution thereof and operating to sever the tip of the ear being tapered.

In testimony whereof I hereby affix my signature.

HENRY A. SHELDON.